Aug. 24, 1965 D. FIRTH 3,201,953

TORQUE LIMITING DEVICE

Filed Oct. 30, 1961 7 Sheets-Sheet 1

INVENTOR.
DAVID FIRTH
BY Hobbs & Easton
ATTORNEYS

INVENTOR.
DAVID FIRTH
BY Hobbs & Easton
ATTORNEYS

INVENTOR.

DAVID FIRTH

BY Hobbs & Easton

ATTORNEYS

INVENTOR.
DAVID FIRTH
BY Hobbs & Easton
ATTORNEYS

Aug. 24, 1965

D. FIRTH 3,201,953

TORQUE LIMITING DEVICE

Filed Oct. 30, 1961

7 Sheets-Sheet 5

INVENTOR.
DAVID FIRTH
BY Hobbs & Easton
ATTORNEYS

INVENTOR.
DAVID FIRTH
BY Hobbs & Easton
ATTORNEYS

INVENTOR.
DAVID FIRTH
BY Hobbs & Easton
ATTORNEYS 3,201,953

TORQUE LIMITING DEVICE

David Firth, South Bend, Ind., assignor to Dodge Manufacturing Corporation, Mishawaka, Ind., a corporation of Indiana Filed Oct. 30, 1961, Ser. No. 148,634
5 Claims. (Cl. 64—30)

The present invention relates to a torque limiting device and more particularly to a mechanism for use in conjunction with power drives, such as, for example, sprockets, V-belt sheaves, and gears, for rendering these drives inoperable when a predetermined maximum torque load is applied thereto.

Various types of mechanisms have been incorporated in chain and belt drives which render them momentarily or temporarily inoperative when a predetermined torque load is exceeded, or which interrupts the operation of the drives when the torque load is exceeded until the overload condition is relieved and the mechanism is reset for continued operation. These mechanisms are often relatively complex. difficult to adjust to the degree of maximum torque load desired on the drive, or will not maintain the desired torque load setting over long continued operation of the drives. One of the principal objects of the invention is to provide a torque limiting device or mechanism for use in conjunction with power drives of the type consisting of sprockets, pulleys, sheaves, gears and the like, which can be easily and readily set to respond effectively to predetermined maximum torque load without any substantial force being involved in making an adjustment, and which can be incorporated into the drive without materially increasing the size or overall space requirements beyond that normally required for similar conventional drives.

Another object of the invention is to provide a mechanism of the aforesaid type which can be calibrated during fabrication so that the desired setting can be readily determined and effectively maintained after the drive embodying the mechanism is finally installed, and which can be adjusted to the desired setting with small, easy to use, standard tools, either at the manufacturing plant or at the place of installation.

A further object is to provide a torque limiting mechanism for use in conjunction with the aforementioned types of power drives, simple in construction and operation and reliably and effectively adjustable to within narrow limits of the desired maximum torque load placed on the drive.

Still another object of the invention is to provide an overload mechanism for sprockets, sheaves and similar power drive units, which is constructed as an integral part of the unit and which does not interfere with nor change the manner in which the units are mounted on the drive or driven shafts.

Additional objects and advantages of the invention will become apparent from the following description and accompanying drawings, wherein.

Figures 1, 2, 3:
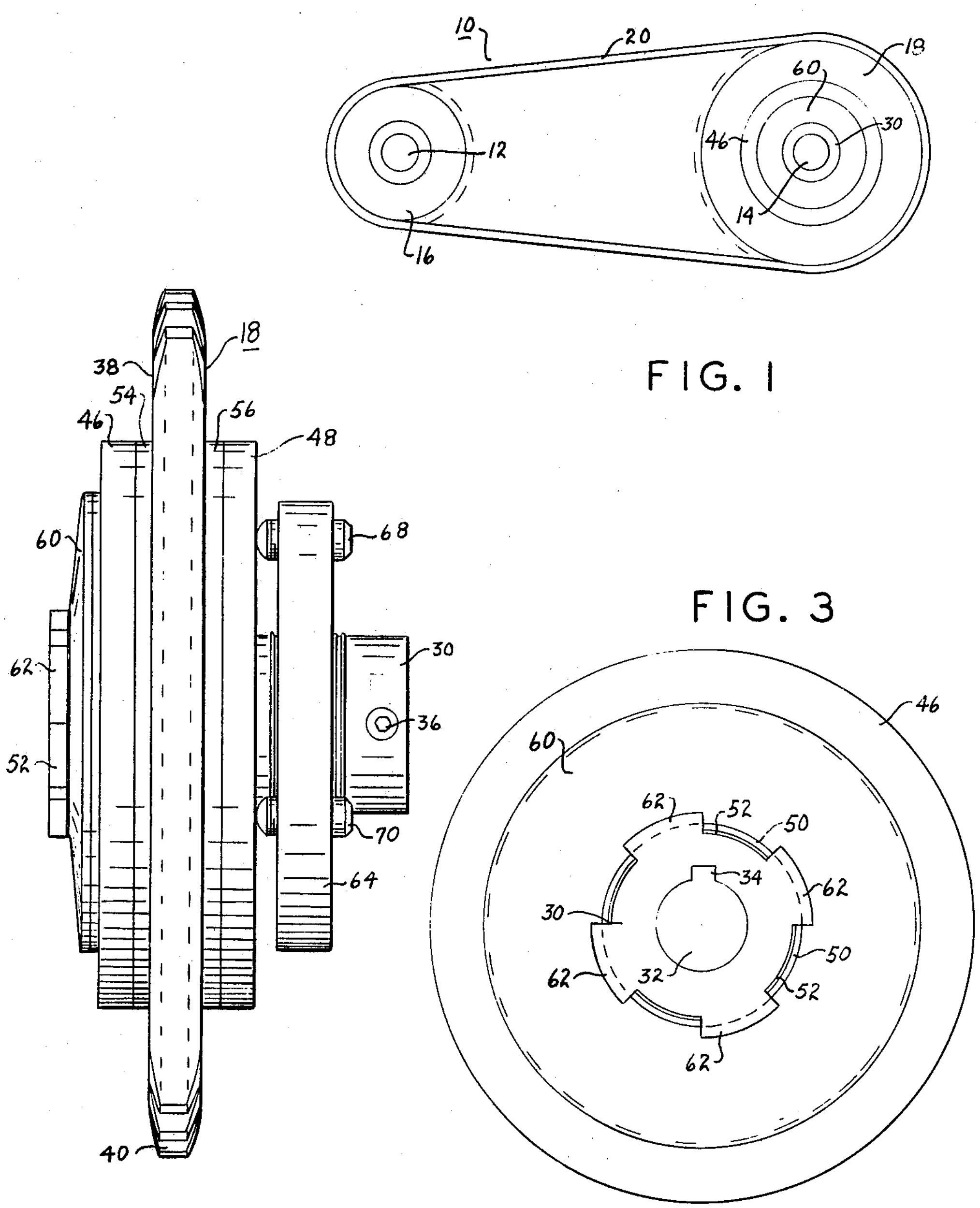
FIGURE 1 is a side elevational view of a power drive mechanism consisting of drive and driven shafts and sprockets and connecting chain.
FIGURE 2 is an enlarged elevational view of the edge of the large sprocket shown in FIGURE 1.
FIGURE 3 is an enlarged side elevational view of the hub and torque limiting mechanism shown in FIGURE 2.

Referring more specifically to the drawings and to FIGURE 1 in particular, wherein a power drive 10 is illustrated, numerals 12 and 14 designate drive and driven shafts on which are mounted sprockets 16 and 18, respectively, and an interconnecting chain 20. The present torque limiting device or mechanism is incorporated in the driven sprocket 18, although it may be incorporated in either the drive or driven sprockets, and it may be incorporated in other types of power drives, such as for example, V-belt drives, gear trains and couplings. The present mechanism is designed for conventional power drives of the foregoing types and will protect the equipment, including the drive and driven mechanism and the drive itself, from damage from excessive torque loads by predetermined settings on the torque limiting mechanism.

The sprocket 18 of FIGURES 1 through 6 embodying the present invention consists of a hub 30 having a longitudinal bore 32 therethrough, keyway 34 and set screw 36 extending through the hub for engagement with a key inserted in keyway 34 after the sprocket has been mounted onto shaft 14. A sprocket plate 38 having teeth 40 of conventional shape and design on the periphery thereof is mounted on hub 30 near the center portion thereof, preferably with a sleeve bearing 42 interposed between the external surface of the hub and the inner surface 44 of plate 38 defining a center bore in plate 38. With this construction, sprocket plate 38 is adapted to rotate relative to hub 30 whenever a predetermined torque load on the drive is exceeded. Mounted on hub 30 on either side of sprocket plate 38 are pressure plates 46 and 48, each plate being annular-shaped and being splined with the hub, the spline consisting of interlocking lugs on the plates seating in longitudinal grooves 52 in the external surface of hub 30. The spline prevents relative rotational movement between the hub and the plates 46 and 48, while permitting longitudinal movement of the two plates on the hub, either together or relative to one another. Frictional elements 54 and 56 of any suitable friction material are secured to the inner face of pressure plates 46 and 48, respectively, and are adapted to seat against the adjacent lateral faces of sprocket plate 38, and to grip the plate so that pressure plates 46 and 48 and sprocket plate 38 will rotate in unison throughout all normal operations of the drive.

An annular resilient means 60, such as a Belleville spring washer, of frusto-conical shape, is mounted on hub 30 on the external side of pressure plate 46, with the large edge thereof engaging the external surface of plate 46 and the inner edge thereof resting on the external surface of hub 30. The resilient means is retained on the hub by an abutment means consisting of annularly spaced lugs or bosses 62 mounted on and preferably formed integrally with the hub adjacent one end thereof, holding washer 60 on the hub and preventing axial movement thereon when the torque limiting mechanism is adjusted to the position shown in FIGURE 6. Mounted on hub 30 adjacent pressure plate 48 is a backing ring 64 having internal threads for engaging threads 66 on the external surface of the hub and containing three adjustment screws 68, 70 and 72.

Figures 4, 5, 6:
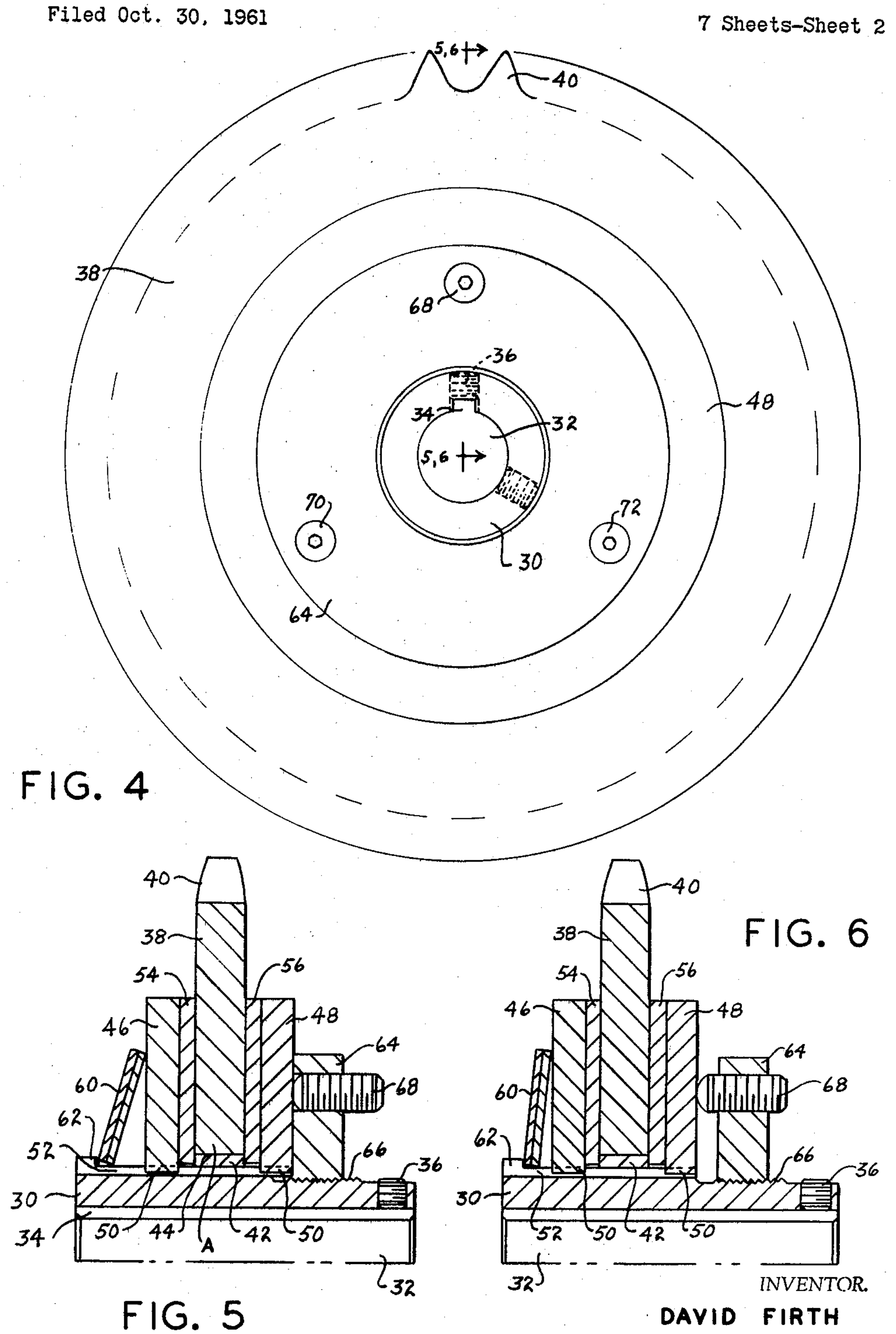
FIGURE 4 is an elevational view of the large sprocket shown in the preceding figures, showing the side opposite that shown in FIGURES 1 and 3.
FIGURE 5 is a vertical cross sectional view taken on line 5—5 of FIGURE 4, showing the torque mechanism before adjustment.
FIGURE 6 is a vertical cross sectional view taken on line 6—6 of FIGURE 4, showing the torque mechanism after adjustment.

When the foregoing sprocket assembly is mounted on a shaft, the parts thereof assume the position shown in FIGURE 5, with the backing ring threaded onto the hub until the inner surface thereof engages the external surface of pressure plate 48 without applying any substantial pressure thereto. In adjusting the torque limiting mechanism to the desired load, the three set screws 68, 70 and 72 are tightened so that the inner end thereof engages the external surface of plate 48, and shifts plates 46, 48 and sprocket plate 38 to the left as shown in FIGURES 5 and 6 in opposition to the force of resilient washer 60. The compression of washer 60 applies a frictional force between frictional elements 54 and 56 and the respective surfaces of plate 38, the amount of the force increasing with the increased pressure applied by screws 68, 70 and 72. The desired maximum torque load below which no relative rotation will occur between plates 46 and 48 and sprocket plate 38 is thereby selected. In the event the torque load exceeds the desired maximum load, hub 30 and plates 46 and 48 remain stationary while sprocket plate 38 continues to rotate along with drive sprocket 16 and chain 20. Once the excess torque load has diminished to a point below that set on the torque limiting mechanism, plates 46 and 48 and hub 30 will again rotate in unison with the sprocket plate. The maximum torque load can be readily adjusted to suit requirements by adjusting screws 68, 70 and 72 without otherwise disturbing the power drive installation.

Figure 7:
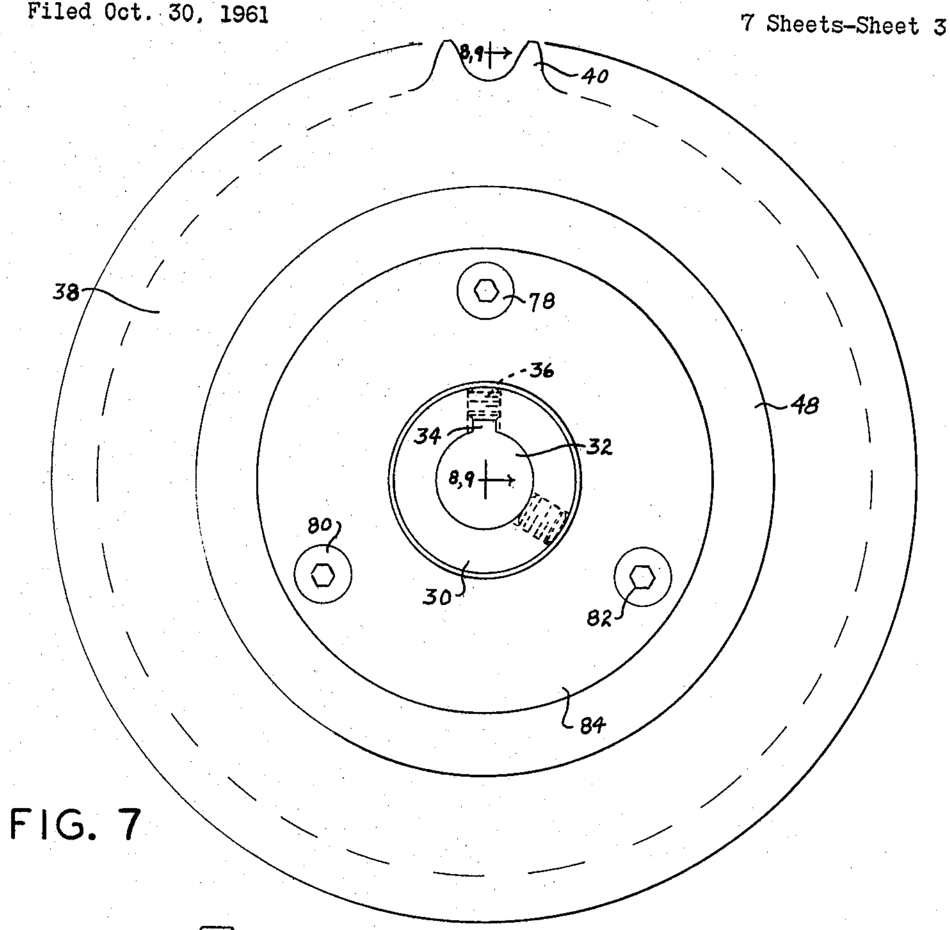
FIGURE 7 is a side elevational view of a modified form of the present sprocket.
Figure 8:
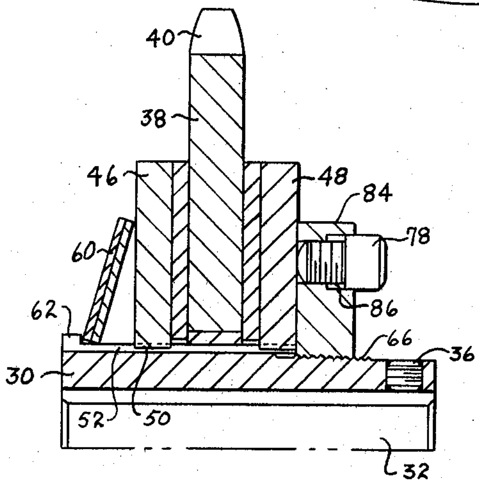
FIGURE 8 is a vertical cross sectional view of the sprocket shown in FIGURE 7, taken on line 8—8, illustrating the torque mechanism embodied therein before adjustment.
Figure 9:
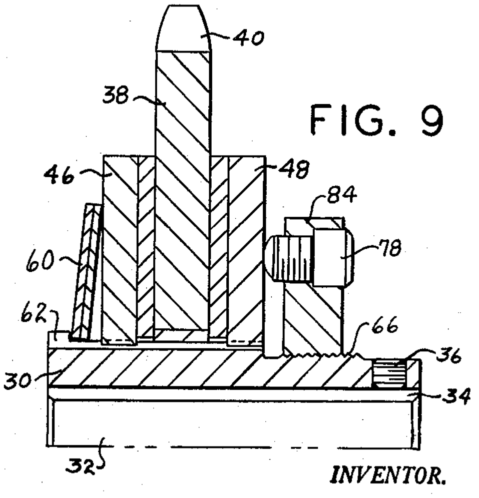
FIGURE 9 is a vertical cross sectional view taken on line 9—9 of FIGURE 7, showing the torque mechanism after adjustment.

The embodiment of the invention disclosed in FIGURES 7, 8 and 9 is similar in most respect to the embodiment previously described, and hence will not be described in detail here, like numerals being used for like parts in this description. The primary difference between the two embodiments consists in the use of cap screws 78, 80 and 82 in ring 84, the ring being substantially the same as ring 64 with the exception of recessed bores 86 for receiving the head of the respective cap screw. With this construction, the unit can be calibrated for a predetermined torque. When the unit has been assembled in the manner shown in FIGURE 8, cap screws 78, 80 and 82 are tightened until the heads thereof seat on the bottom of recesses 86, thus compressing washer 60 a predetermined amount, and applying a predetermined pressure onto sprocket plate 38. This calibrated torque load can be varied by positioning ring 84 in various preselected positions along threaded portion 66, thereby permitting the manufacturer of the sprocket assembly to provide the operator with the means for accurately assembling and applying the required torque load without any intricate testing operations at the place of installation.

Figure 10:
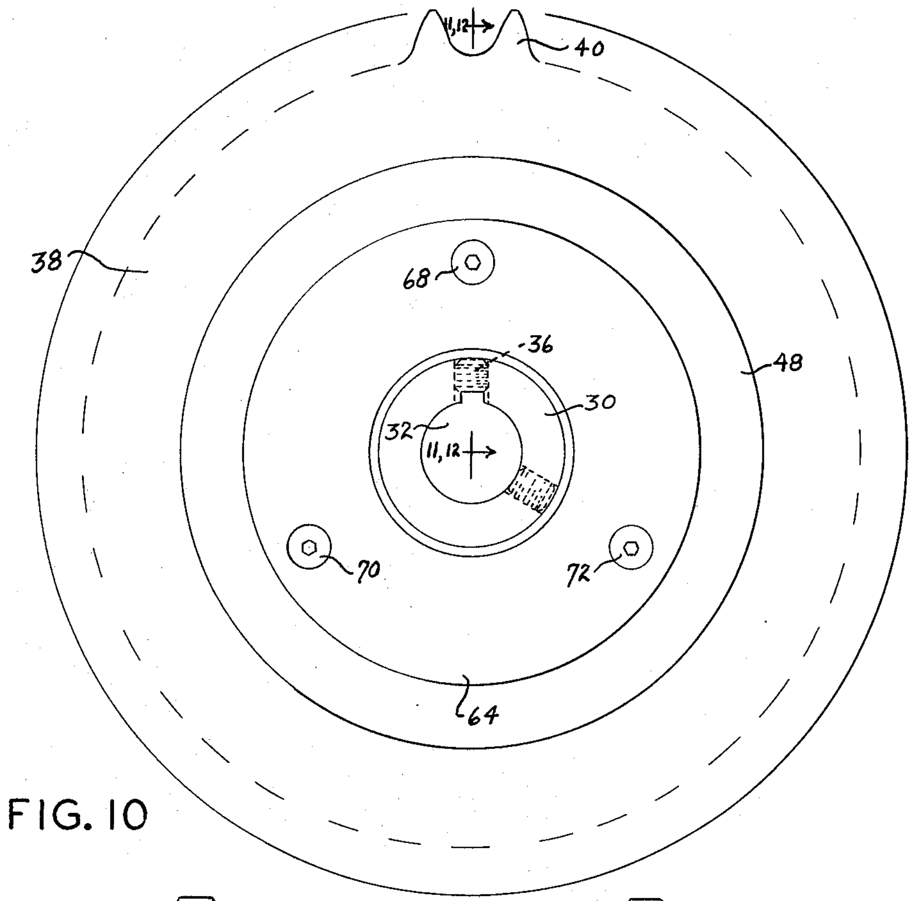
FIGURE 10 is another modified form of the present sprocket construction embodying the present invention.
Figure 11:
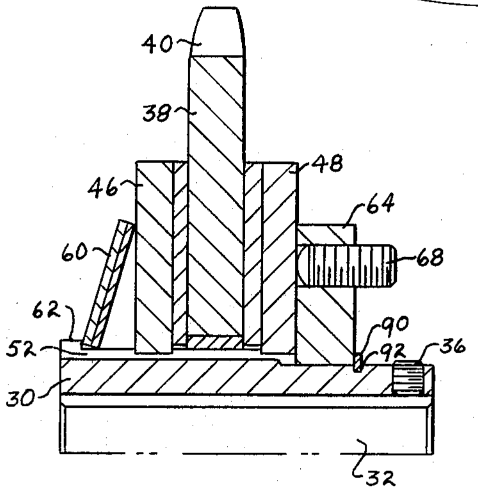
FIGURE 11 is a vertical cross sectional view of the sprocket shown in FIGURE 10, taken on line 11—11, illustrating the torque mechanism embodied therein before adjustment.
Figure 12:
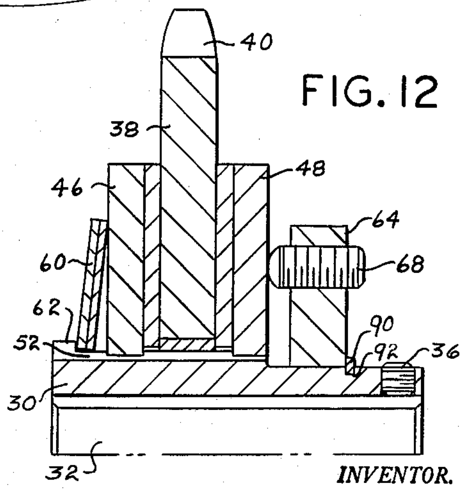
FIGURE 12 is a vertical cross sectional view taken on line 12—12 of FIGURE 10, showing the torque mechanism after adjustment.

In FIGURES 10, 11 and 12, the torque limiting mechanism is similar to that shown in the first embodiment disclosed herein, the principal difference consisting of the use of a snap ring 90 in annular groove 92 in the external surface of hub 30 for retaining backing ring 64 in place on the hub after the unit has been assembled and while pressure screws 68, 70 and 72 are applying the required pressure on plate 48. When the unit is initially assembled, washer 60, pressure plate 46, sprocket plate 38 and pressure plate 48 are slipped onto the hub from the right-hand end thereof, as viewed in FIGURES 11 and 12, and backing plate 64 with screws 68, 70 and 72 withdrawn to the position shown in FIGURE 11 is slipped onto the hub to the position at which groove 92 is to the right thereof. Snap ring 90 is then inserted in the groove, and the set screws tightened to give a desired maximum torque load limit, as illustrated in FIGURE 12.

Figure 13:
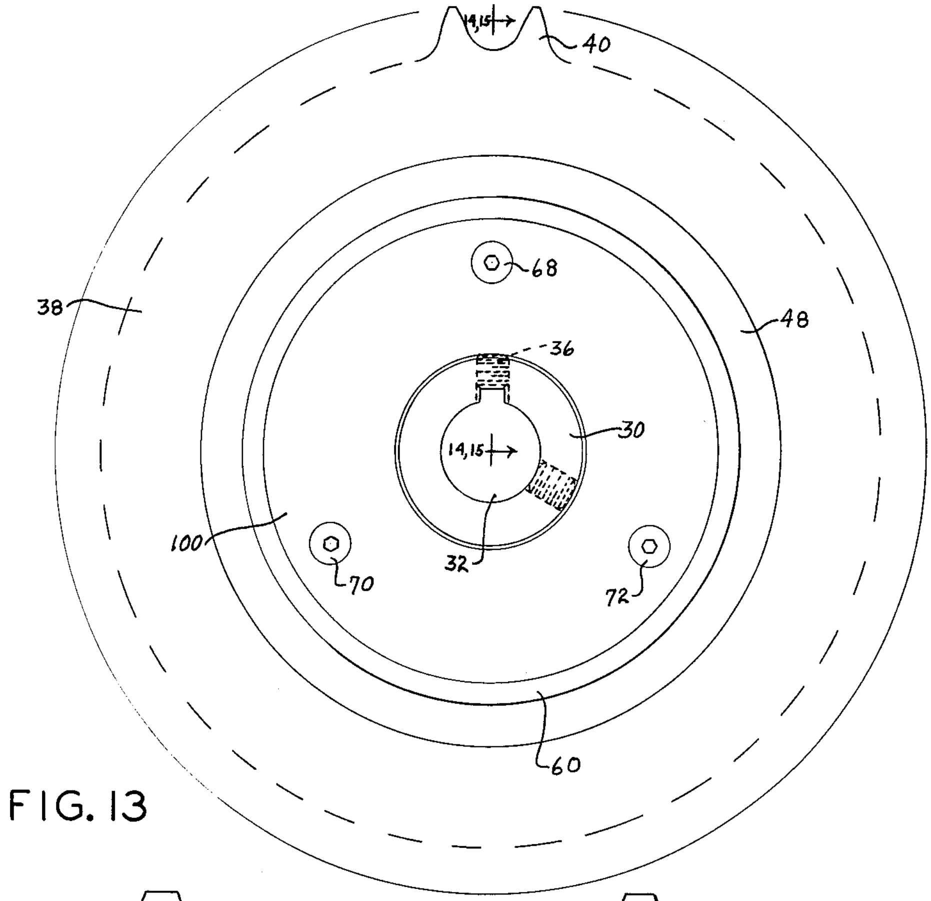
FIGURE 13 is a side elevational view of a sprocket showing a further modified form of the present invention.
Figure 14:
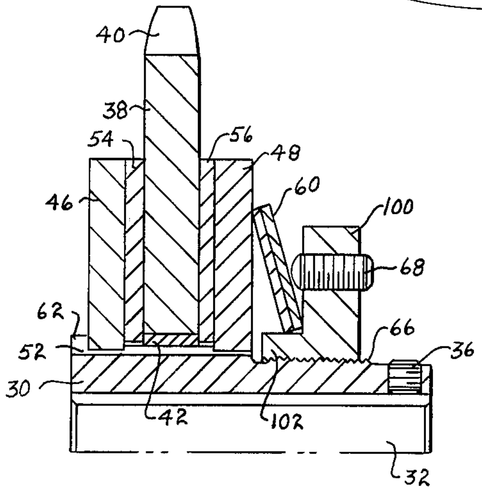
FIGURE 14 is a vertical cross sectional view of the sprocket shown in FIGURE 13, taken on line 14—14, illustrating the torque mechanism before adjustment.
Figure 15:
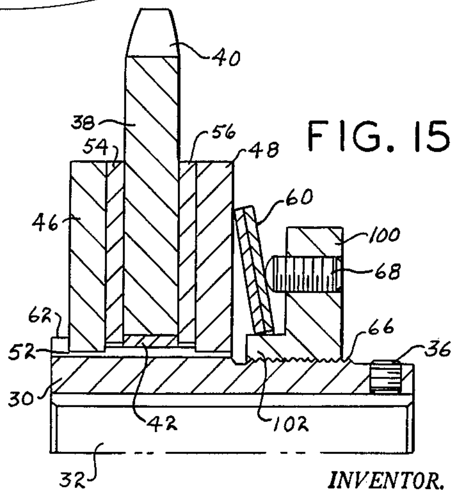
FIGURE 15 is a vertical cross sectional view taken on line 15—15 of FIGURE 13, illustrating the torque mechanism after adjustment.

The embodiment of the present invention illustrated in FIGURES 13, 14 and 15 is similar to the first embodiment described herein, the primary difference being the shifting of washer 60 from the left-hand side as viewed in FIGURE 5 to the right-hand side as viewed in FIGURE 14. The backing ring 100 of this embodiment is threadedly mounted on hub 30, and is provided with axially extending flange 102 for receiving the inner edge of washer 60, the outer edge of the washer resting against the external surface of pressure plate 48 and the internal edge abutting against ring 100. When set screws 68, 70 and 72 are tightened, the inner ends thereof engage the external surface of washer 60, forcing said washer toward plate 48 and applying pressure against sprocket plate 38. The inner edge of pressure plate 46 seats against abutment 62, preventing axial movement of plates 38, 46 and 48 as pressure is applied by the set screws.

Figure 16:
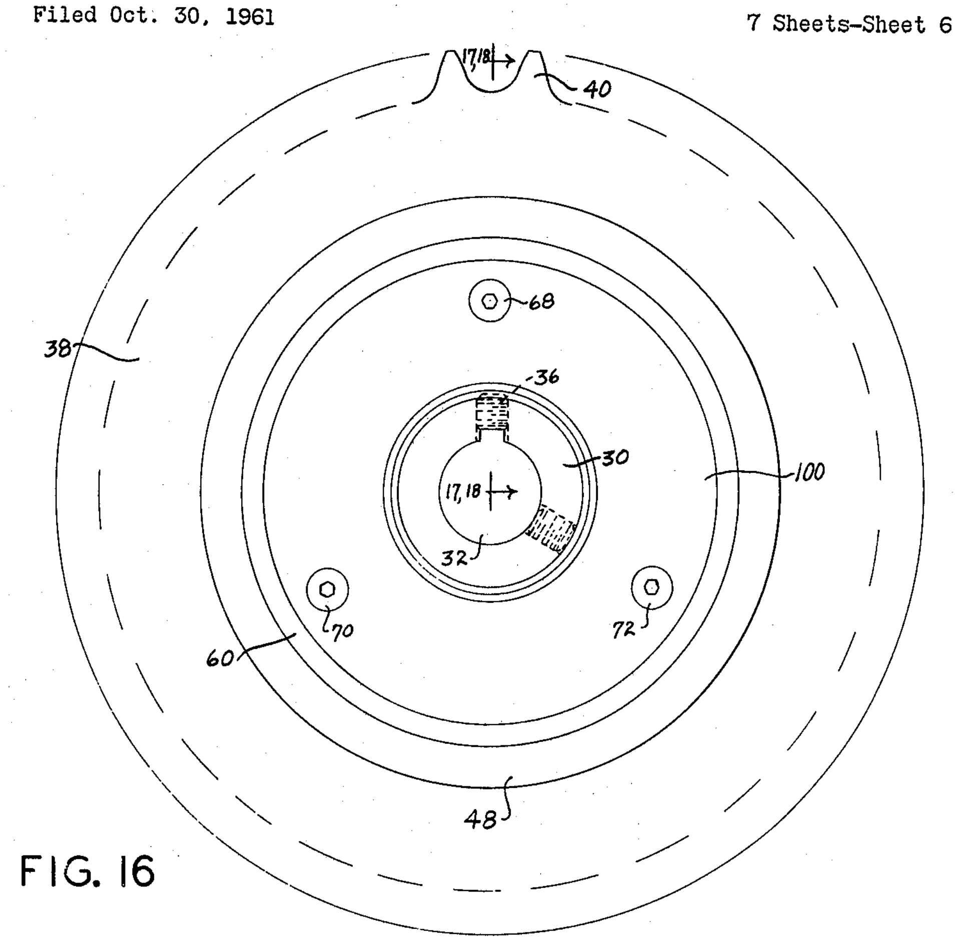
FIGURE 16 is a side elevational view of a sprocket showing a still further modified form of the present invention.
Figure 17:
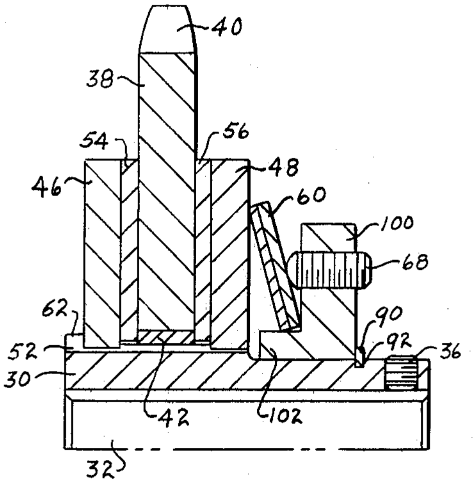
FIGURE 17 is a vertical cross sectional view of the sprocket shown in FIGURE 16, taken on line 17—17, illustrating the torque mechanism before adjustment.
Figure 18:
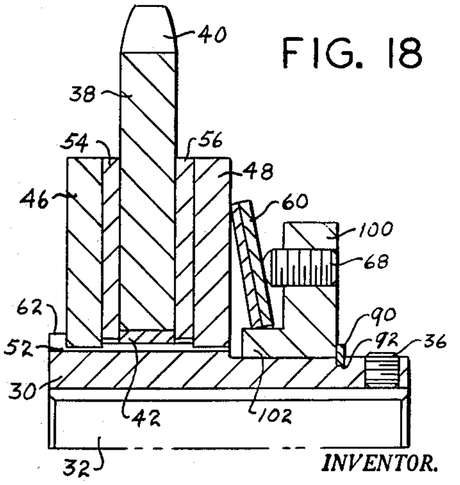
FIGURE 18 is a vertical cross sectional view taken on line 18—18 of FIGURE 16, illustrating the torque mechanism after adjustment.

The embodiment of the present invention illustrated in FIGURES 16, 17 and 18 is similar to the last embodiment described with the exception that snap ring 90 is used in place of threads 66 and is seated in annular groove 92 in the external surface of the hub. Plate 100 engages the snap ring and is retained in fixed position thereby throughout the operation of the sprocket.

Figures 19, 20:
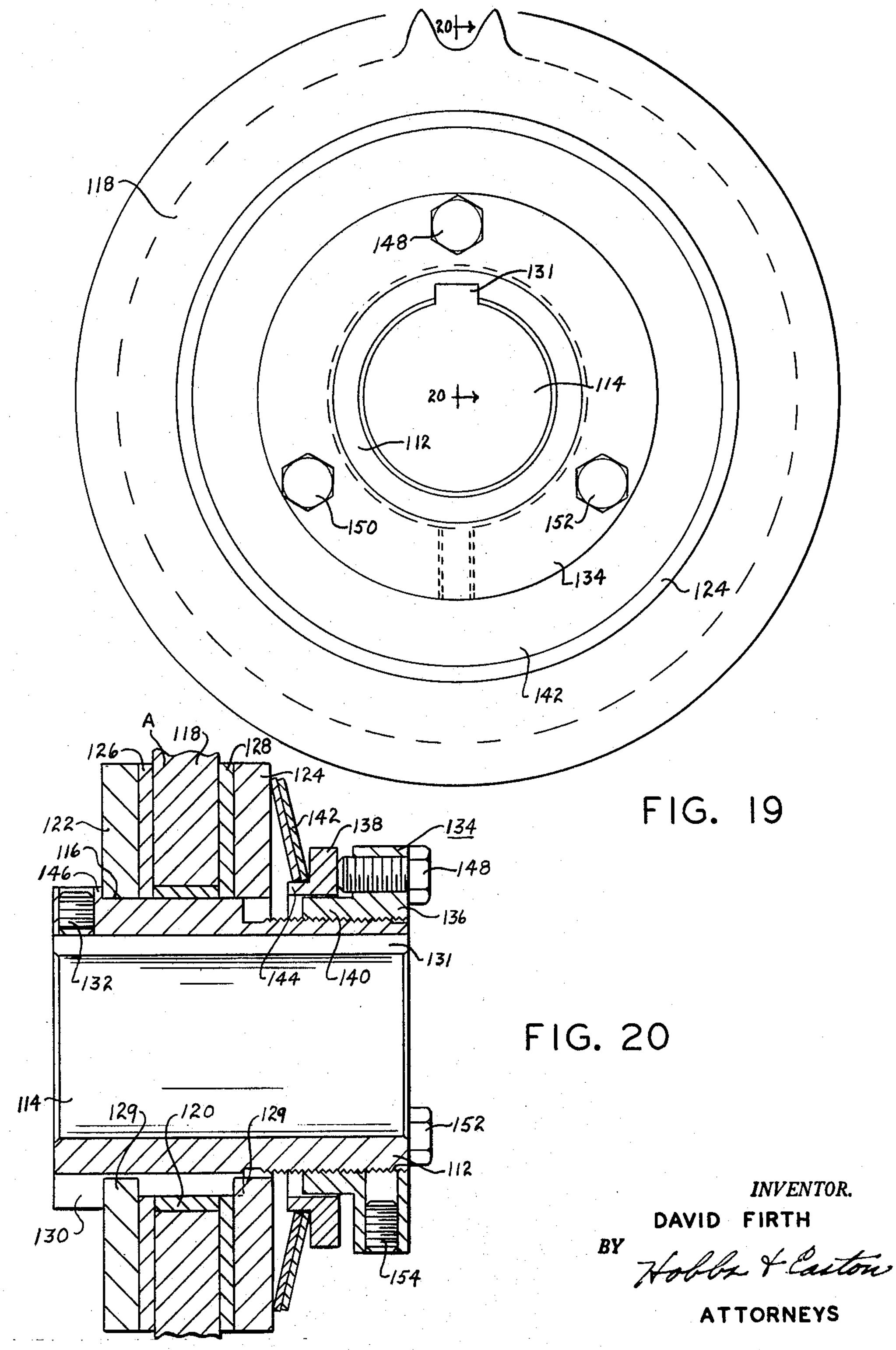
FIGURE 19 is a side elevational view of a sprocket showing a still further embodiment of the present invention.
FIGURE 20 is a vertical cross sectional view of the sprocket shown in FIGURE 19, taken on line 20—20, illustrating the torque adjustment mechanism after an adjustment has been made.

The embodiment of the invention shown in FIGURES 19 and 20 includes a number of features previously described herein; however, the structure is somewhat different and will be described in detail. The sprocket assembly consists of hub 112 having a bore 114 therethrough and an annular external portion 116 concentric with bore 114. A sprocket plate 118 is mounted on portion 116, preferably with a sleeve bearing 120 disposed therebetween, and is adapted to rotate relative to hub 112. Mounted on opposite sides of plate 118 are pressure plates 122 and 124, containing friction elements 126 and 128, respectively, on the inner sides thereof for engaging the adjacent faces of sprocket plate 118, plates 122 and 124 having lugs 129 extending into longitudinal groove 130 in the hub. The hub 112 is keyed by a key in keyway 131 to the shaft and is held rigidly thereon by set screw 132 extending through the hub and engaging a key in the keyway.

The torque limiting mechanism includes a two-part backing ring 134 having an annular member 136 threaded onto the hub and a second annular member 138 resting on a flange 140 of annular member 136. A resilient washer 142, similar to washer 60, slips over and rests on flange 144 of the annular member 138 and abuts against the external surface of pressure plate 124. Annular member 138 is urged inwardly, by screws 148, 150 and 152 extending through annular member 136, against washer 142 to seat pressure plate 122 against abutments 146 and to apply pressure simultaneously on plates 122 and 124 and on the external surfaces of sprocket plate 118. This torque limiting mechanism can be calibrated to give the desired torque load without any substantial work being performed at the place of installation by positioning annular member 136 in preselected locations along the threaded surface of the hub, locking the member in place with set screw 154 and thereafter tightening screws 148, 150 and 152 until the heads thereof engage the external surface of annular member 136.

Throughout the specification, the description has been directed to a sprocket assembly. However, the hub and torque limiting mechanism can be used in their entirety without change for a V-belt, sheave, pulley or gear by merely substituting for the sprocket plate 38 and 118 a drive plate A of a sheave, pulley or gear element. While a number of variations and modifications have been described in detail herein, additional changes and modifications and combinations of various features may be made to suit requirements.

I claim:

1. A torque limiting mechanism for use in combination with sprockets, sheaves, pulleys, gears and the like, comprising a cylindrically-shaped hub having a longitudinal bore therethrough and a plurality of longitudinal grooves on the external surface and annular abutment means on the external surface of said hub, a threaded portion on the external surface of said hub spaced from said means, a pair of annular pressure plates with a center opening on said hub disposed between said means and said threaded portion and having friction material on their inner side surfaces and lug means extending into said longitudinal grooves, a disc-shaped drive plate rotatably mounted on said hub between said pressure plates, a ring member threadedly received in predetermined position on said threaded portion and having three threaded holes therethrough with enlarged outer end portions, an annular resilient means interposed between said abutment means and the adjacent pressure plate, and adjustment screws in the holes of said ring member for engaging the adjacent pressure plate, each of said screws having a head seating against said ring in the outer portion of the respective hole in said ring for determining the torque required to cause relative rotation between said pair of pressure plates and said drive plate.

2. A torque limiting mechanism for use in combination with sprockets, sheaves, pulleys, gears and the like, comprising a hub having an abutment on the external surface, a second abutment on the external surface of said hub spaced from said first abutment, a pair of relatively movable annular pressure plates with a center opening on said hub disposed between said abutments and having friction material on their inner side surfaces and being splined with said hub, a disc-shaped drive plate rotatably mounted on said hub between said pressure plates, a ring member mounted in predetermined position on said hub against said second abutment and having a plurality of threaded holes therethrough, an annular resilient means interposed between said first abutment and the adjacent pressure plate, and adjustment screws in the holes of said ring member, each of said screws having a head seating against said ring member and engaging the adjacent pressure plate for determining the torque required to cause relative rotation between said pair of pressure plates and said drive plate.

3. A sprocket having a torque limiting mechanism, comprising a hub having two spaced abutments on the external surface, a pair of annular pressure plates with a center opening on said hub disposed between said abutments and having friction material on their inner side surfaces and being splined with said hub, a sprocket plate rotatably mounted on said hub between said pressure plates, a ring member mounted in predetermined position on said hub against one of said abutments and having a plurality of threaded holes therethrough, an annular resilient means urging said pressure plates against said sprocket plate, and adjustment screws in the holes of said ring member, each of said screws having a head seating against said ring member and engaging the adjacent pressure plate for determining the torque required to cause relative rotation between said pair of pressure plates and said sprocket plate.

4. A sheave having a torque limiting mechanism, comprising a hub having a longitudinal means on the external surface, an abutment on the external surface of said hub, a second abutment on the external surface of said hub spaced from said first abutment, a pair of annular pressure plates with a center opening on said hub disposed between said abutments and having friction material on their inner side surfaces and means for engaging said longitudinal means, a sheave drive plate rotatably mounted on said hub between said pressure plates, a ring member mounted in predetermined position on said hub against one of said abutments and having a plurality of threaded holes therethrough, an annular resilient means urging said pressure plates against said drive plate, and adjustment screws in the holes of said ring member, each of said screws having a head seating against said ring member and engaging the adjacent pressure plate for determining the torque required to cause relative rotation between said pair of pressure plates and said pulley plate.

5. A torque limiting mechanism, comprising a hub having a longitudinal means on the external surface, a pair of spaced abutments on the external surface of said hub, a pair of annular pressure plates with a center opening on said hub disposed between said abutments and having friction material on their inner side surfaces and means for engaging said longitudinal means, a drive plate rotatably mounted on said hub between said pressure plates, a ring member mounted in predetermined position on said hub against one of said abutments and having a plurality of threaded holes therethrough, an annular resilient plate urging said pressure plates against said drive plate, and adjustment screws in the holes of said ring member, each of said screws having a head seating against said ring member and applying pressure to the adjacent plate for determining the effective force of said resilient plate on said plates.

References Cited by the Examiner

UNITED STATES PATENTS

| | | | |
|---|---|---|---|
| 1,043,111 | 11/12 | King et al. | 64—30 |
| 1,684,679 | 9/28 | Nixon | 64—30 |
| 1,942,512 | 1/34 | Lee. | |
| 2,651,530 | 9/53 | Blydenburgh | 64—30 XR |
| 2,659,220 | 11/53 | Cherry | 64—30 XR |
| 2,704,191 | 3/55 | Schley et al. | |
| 2,753,703 | 7/56 | McIntyre | 64—30 |

ROBERT C. RIORDON, *Primary Examiner.*

KARL J. ALBRECHT, DON A. WAITE, FRANK SUSKO, *Examiners.*